United States Patent [19]

Raviv

[11] Patent Number: 4,774,618
[45] Date of Patent: Sep. 27, 1988

[54] METHOD OF AND APPARATUS FOR STORING AND RETURNING INFORMATION ON A BUSINESS CARD

[76] Inventor: Abiel Raviv, 52 Hasharon Street, Yavne 70600, Israel

[21] Appl. No.: 906,904

[22] Filed: Sep. 15, 1986

[51] Int. Cl.⁴ .................... G11B 5/016; G11B 17/02
[52] U.S. Cl. ................................ 360/133; 360/2; 360/99
[58] Field of Search .................. 360/2, 133, 99

[56] References Cited

U.S. PATENT DOCUMENTS 4,297,570 10/1981 Kowalski et al. .................. 360/2
4,592,042 5/1986 Lemelson et al. .................. 360/2

Primary Examiner—Robert S. Tupper
Attorney, Agent, or Firm—Sandler & Greenblum

[57] ABSTRACT

A method for reading data stored on a magnetic strip on a business card includes the step of mounting the card on a floppy disk carrier that operates in a floppy disk drive of a computer. The floppy disk carrier is inserted into a floppy disk drive of a computer which is then operated so that the read/write head of the floppy disk drive moves relative to the magnetic strip thereby reading the information stored thereon.

18 Claims, 2 Drawing Sheets

METHOD OF AND APPARATUS FOR STORING AND RETURNING INFORMATION ON A BUSINESS CARD

TECHNICAL FIELD

This invention relates to a method of and apparatus for storing and retrieving information on a business card.

BACKGROUND ART

Almost every person in business has carried business cards to hand out to others, or has received business cards from other individuals. Conventionally, business cards contain the name and address of an individual, a company name and address, and perhaps some advertising message dealing with products or services offered. Usually, business cards are collected and visually inspected some time later to obtain telephone numbers of individuals and to identify products or services, etc. Arrangements are available to store business cards in a physical format that facilitates their visual inspection.

One of the problems of maintaining a library of business cards is the difficulty in arranging the data therein by individual name, or company name, or categorizing the cards by product and/or services. With the proliferation of computers, programs are now available that facilitate establishing and maintaining a library of business cards. Such programs, however, require manual keying of names, addresses, telephone numbers, services, etc. into a database which then can be accessed to permit sorting in almost any desired manner to provide printouts of any desired fields of data in any order. Manual keying of data is, however, time consuming and frequently inaccurate; and for this reason, individuals often resist this task. It is therefore an object of the present invention to provide a new and improved method of and means for storing and retrieving information on a business card which eliminates the need to handkey data.

BRIEF DESCRIPTION OF THE INVENTION

A method according to the invention for storing preselected data on a business card comprises the step of writing the preselected data to a magnetic strip that is detachably connected to a floppy diskette carrier that operates in a floppy disk drive of a computer. The strip can then be detached from the carrier and attached either permanently or removably to a business card. In this method, an operator of a computer can store whatever information is desired, for example in ASCII characters, on the magnetic strip in the same manner that the operator would normally store the same information on the magnetic surface of a conventional floppy diskette. Under the present invention, however, the magnetic strip on which the information is stored is removable from the floppy diskette and transferred to a business card.

The invention also includes a method for reading data from or writing data to a magnetic strip carried by a business card. This method includes mounting the card on a floppy diskette carrier that operates in a floppy diskette drive of a computer, inserting the floppy diskette carrier into a floppy disk drive of a computer, and operating the computer so that the read/write head thereof moves relative to the magnetic strip thereby reading information from or writing information to the strip.

The invention also consists in a floppy disk system for a computer having a floppy disk drive with a read/write head, the system comprising floppy diskette means including a carrier rotatably mounted in a jacket. The floppy diskette means is constructed and arranged for insertion into the floppy diskette drive of the computer so that the read/write head thereof is operatively positioned relative to the carrier. A magnetic substrate is provided on the carrier; and the substrate may be permanently or releaseably attached to the carrier. The substrate, which may be curved or linear, may be attached to a business card.

The invention also consists in a floppy diskette system having a floppy disk drive with a read/write head including a jacket constructed and arranged for insertion into the floppy diskette drive of the computer, and having a cut-out portion aligned with the read head which is radially displaceable relative to the axis about which the floppy disk rotates when the jacket is inserted into the floppy diskette drive. A business card, having a linear or a curvilinear magnetic stripe affixed thereto is provided; and the invention includes means mounting the card on the jacket so that the magnetic strip is in operative relation to the read/write head when the jacket is inserted into the floppy diskette drive.

BRIEF DESCRIPTION OF DRAWINGS

Embodiments of the present invention are shown in the accompanying drawings wherein.

DETAILED DESCRIPTION

Figure 1:
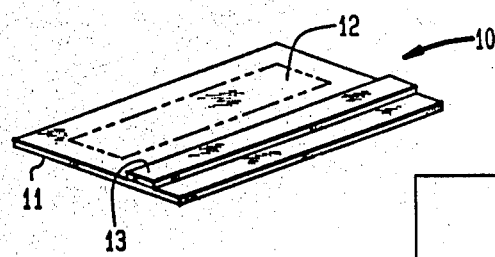
FIG. 1 is a perspective view of a business card carrying a magnetic stripe.

Referring now to FIG. 1 of the drawings, reference numeral 10 designates a business card according to the present invention comprising paper substrate 11 bearing printed indicia 12 such as text, and magnetic strip 13. Indicia 12 is typically a company name and address, telephone number, possibly a product or service identification, and the name of an individual. Magnetic strip 13 contains the same information, and perhaps more, contained in indicia 12 except that the information is in machine-readable form. ASCII data may therefore be stored on strip 13 in conventional format such as used with standard personal computers in general use today. For example, the format may be MS- or PC-DOS at 388K bytes per 5¼ inch floppy diskette, or may be formatted for CP/M format at 241K byte per 8 inch floppy diskette, etc.

Figure 2:
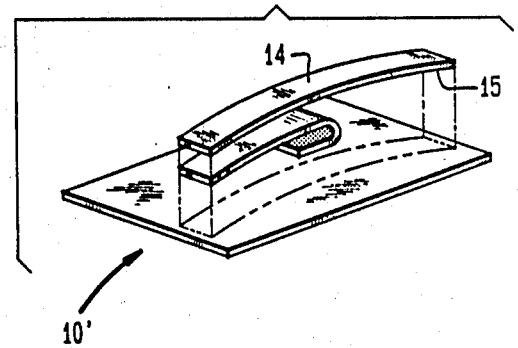
FIG. 2 is a perspective drawing of a business card showing a magnetic stripe for attachment thereto.

FIG. 1 shows magnetic strip 13 as being a linear strip but the strip can be curvilinear as illustrated in FIG. 2. The curvature of the strip on card 10' in FIG. 2 is related to a conventional floppy diskette as will be described below.

Strip 13 may be permanently or removably attached to paper substrate 11. That is to say, substrate 11 can be printed in a conventional manner on conventional paper so that indicia 12 is readable by humans in a conventional manner. Strip 13 can be affixed to the card at a later data; or, the card itself may be provided with a magnetic strip much the same as fare cards are produced for the Metrorail system in Washington, D.C.

In one form of the invention, the magnetic strip is removably connected to the business card. In such case, the card is printed in the usual manner and the user, or the card manufacturer, places a magnetic strip on the card. As shown in FIG. 2, curved strip 14 release strip may include an adhesive layer 15 to which a cover strip 16 is attached. The cover strip is treated so that it is removable from the adhesive layer to permit the strip to be attached to the business card substrate. This is illustrated in FIG. 2 in terms of a curvilinear strip.

Figure 3:
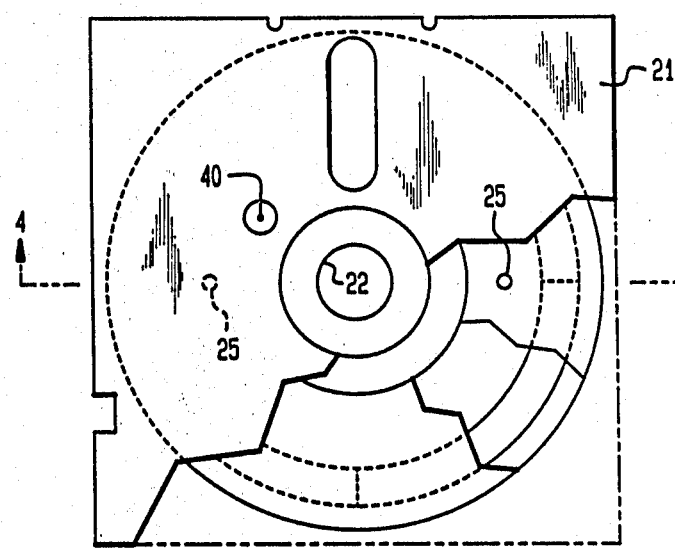
FIG. 3 is a plan view of a floppy diskette carrier and jacket therefor accoring to the present invention.
Figure 4:
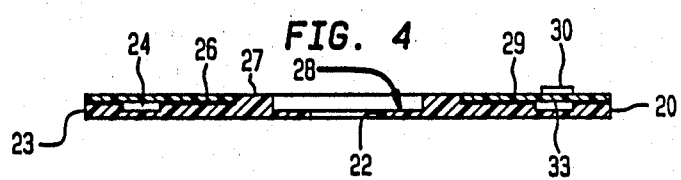
FIG. 4 is a sectional view through the device shown in FIG. 3 taken along the line IV—IV.
Figure 5:
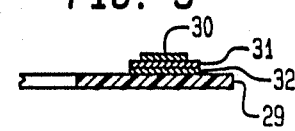
FIG. 5 is a plan view of another embodiment of a floppy diskette device according to the present invention.
Figure 6:
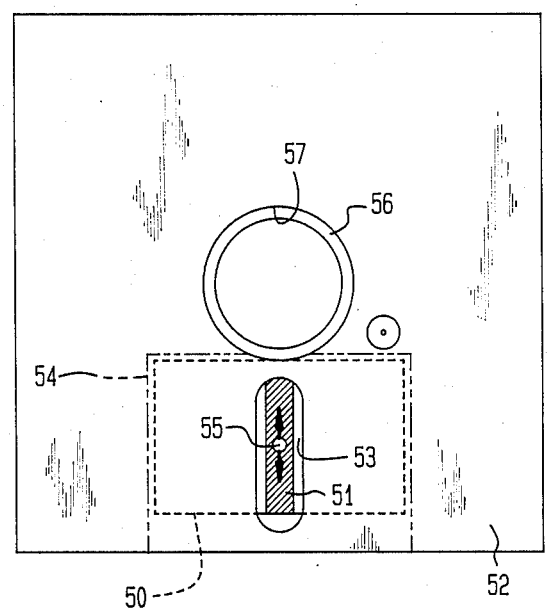
FIGS. 6 and 7 are further embodiments of a floppy diskette carrier according to the present invention.
Figure 7:
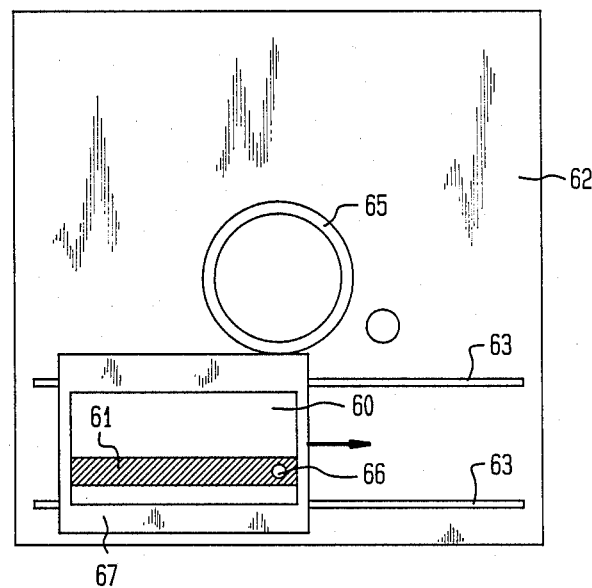

FIGS. 3–5 illustrate apparatus for preparing curvilinear magnetic strips for attachment to a business card like that shown in FIG. 2. FIGS. 6–7 represent ways in which information can be written to, as read from, a linear magnetic strip attached to a business card.

The present invention contemplates storing preselected data, such as text on a business card, by writing the preselected data to a magnetic strip detachably connected to a floppy diskette carrier that operates in a floppy diskette drive of a computer (not shown). Referring to FIGS. 3 and 4, reference numeral 20 designates a floppy diskette carrier according to the present invention of a thickness suitable to fit within conventional jacket 21 that normally holds a conventional floppy disk. That is to say, jacket 21 is formed with three edges sealed peripherally, and contains circular carrier 20 preferably fashioned from a plastic material. Carrier 20, which can be inserted into jacket 21 through the unsealed edge thereof, has a central opening 22 of a size suitable to receive the cone-shaped drive of a conventional floppy diskette drive (not shown), and has an outer peripheral lip 23 defining circumferential groove 24. Diskette carrier 20 also includes one or more locating pins 25 on flat region 26 of the carrier. Raised region 27 adjacent hub 28 defines a circular region for accepting filler sheet 29 that is ring-shaped. This filler sheet may be of paper, or even of thin plastic. A plurality of curvilinear segments of magnetic substrate material 30 are mounted on sheet 29. As shown in detail in FIG. 5, separating strips 31 and 32 are provided between curvilinear magnetic strip 30 and carrier 29. For example, eight separate curvilinear magnetic strips may be provided on sheet 29 equally spaced near the periphery of the sheet. The magnetic strips are provided with an adhesive coating on the undersurface thereof permitting the carrier sheet 32 to be detached from the sheet. This will enable one segment of curvilinear magnetic strip 30 to be removed from the carrier and attached to a business card.

In operation, carrier 20 is first loaded with sheet 29 by aligning openings in the filler with locating pins 25 on the carrier. In this way, curvilinear segments 30 on the filler will be precisely locaated with respect to the location hole 40 in the carrier. The loaded carrier can then be inserted into the jacket, and the assembled floppy diskette carrier can be inserted into a floppy diskette drive of a computer in a conventional manner. Magnetic strip 30 occupies a preselected position radially in the center of rotation of the floppy diskette drive and thus occupies a predetermined track of the drive. Data can be written to this track in a conventional manner. For example a word processing program used with the computer can be used to create a file containing company name, address, telephone number, business service or product, and the name of an individual name as well. This file can be written to the magnetic strip on the floppy diskette carrier inserted in the floppy diskette drive of the computer. Programs exist to define the sector in which data are to be written so that multiple sectors of a given track corresponding to different magnetic strips can be written too.

The data to be written to the magnetic strips can be inputted as a keyboard operation or stored as a file and written automatically under program control. In either event, the present invention, as shown in FIG. 3, provides for writing preselected data to a magnetic strip 30 detachably connected to a floppy diskette carrier 20 that operates in a floppy diskette drive of a computer.

After the preselected data has been written to the magnetic strips on the floppy diskette carrier, the latter may be removed from the floppy diskette drive of the computer to permit carrier 20 to be withdrawn from jacket 21. Thereafter, the magnetic strips can be peeled from the carrier and placed on business cards in the manner indicated in FIG. 2.

After the business card of FIG. 1 or FIG. 2 is distributed, the recipient can utilize the card in a conventional manner by merely reading indicia 12 on the card. Alternatively, and in accordance with the present invention, the user may detach the magnetic strip from the card and reverse the process by which the data was recorded on the strip, in order to read the stored data into a file in a computer. That is to say, the user may remove the strip from the business card and mount it (inside) specially provided groove 33 on a carrier like carrier 20. To facilitate this operation, carrier 20 may be provided with printed indicia which will assist in properly locating the curvilinear strip. Once this is done, or once the entire filler is loaded with strips, the recipient of the card or cards can insert the carrier into a floppy diskette jacket and reverse the process by which data were written on the magnetic strip. In other words, the floppy diskette carrier can be inserted in a floppy diskette drive of a computer, and the computer operated to read the track containing the magnetic strip and each of the sectors thereon. The data so read can be displayed directed on the screen of a monitor or stored in a file contained in the memory of the computer. Alternatively, the data may be stored in predetermined formats such as dBASEII files with the result that the data can be appended automatically to an existing database for the purpose of storing the company name, address, etc. in appropriate fields in each record in the database. With this approach, the stored data can be used to produce report forms after the database is sorted according to almost any desired criteria.

The embodiment shown in FIG. 6 eliminates the need to detach and then reattach a magnetic strip to a business card. In the embodiment of FIG. 6, reference numeral 50 designates a conventional business card carrying a magnetic strip 51 that extends widthwise of the card rather than lengthwise as shown in FIGS. 1 and 2. The lengthwise position of the strip is unimportant and can be anywhere. FIG. 6 shows the strip to be located in the center of the card but this is not necessary. In the embodiment shown in FIG. 6, jacket 52, which is a conventional jacket used for a floppy diskette for a personal computer but is provided with pocket 54 sized to receive and hold business card 50. The pocket in the jacket is constructed and arranged so that magnetic strip 51 is located within read/write slot 53 in jacket 52. In this manner, read/write head 55 of a floppy diskette drive will be located in alignment with the magnetic strip. In such case, the radial displacement of read/write head 55 of the floppy diskette drive would cause the head to traverse a path aligned with the magnetic strip.

To facilitate operation of the floppy diskette drive, dummy jacket 52 may be provided with free-wheeling grommet or hub 56 that fits within circular hole 57 in the jacket. Hub 56 is engageable by the cone drive of a floppy diskette drive and freely rotates without effecting rotation of card 50.

Programs are available for causing the read/write head to move radially with respect to the axis of rotation of the floppy diskette drive thereby enabling data contained in the memory of a computer to be written along the magnetic strip, or data to be read from the strip into the memory of the computer.

In the operation of the embodiment shown in FIG. 6, a user of a business card may prepare the same by having the usual printed indicia added to the card and then applying a magnetic strip to the card as indicated in FIG. 6. Alternatively, the card may be prepared with the magnetic strip already in position. In either case, the user can insert the card into jacket 52 and write to the magnetic strip whatever information is desired to identify the company, address, etc. given by the indicia on the card. The user may then remove the diskette from the floppy diskette drive and remove the card from the jacket. The card may then be given to a potential customer who is aware of the indicia printed on the card. However, the recipient can also store the data on the card by reversing the process followed by the user. That is to say, the recipient can place the card in a jacket of the type shown in FIG. 6, insert the jacket into a floppy diskette drive of a personal computer and, by a suitable program, read the data stored on the magnetic strip.

In the alternative arrangement shown in FIG. 7, business card 60 is provided with a lengthwise running magnetic strip 61 at a predetermined widthwise position on the card. The outer surface of one side of jacket 62 is provided with suitable track 63 on which frame 67 is reciprocally mounted. Business card 60 is clamped or otherwise releasably mounted on frame 67 and can thus reciprocate relative to read/write head 66 as frame 67 reciprocates. In this case, as in the embodiment shown in FIG. 6, the central opening in jacket 62 is provided with a rotatable grommet 65 which is engaged by the cone drive of the floppy diskette allowing the grommet to "free wheel" as the drive is operated. The outer peripheral edge of grommet 65 engages an edge of frame 67 for imparting translation to the frame in one direction (to the right as shown in the drawing) in response to rotation of the grommet. To this end, the grommet may frictionally engage frame 67; or, alternately, a gear and rack configuration may be utilized.

The transitory motion can be imparted to business card 60 while read/write head 66 is operated under the control of the computer at a fixed radial distance from the center of rotation of the grommet. This arrangement simulates reading from or writing to a specific track of a floppy diskette.

I claim:

1. A method for storing preselected data on a business card comprising the steps of:

(a) writing said preselected data to a magnetic strip detachably connected to a floppy diskette carrier that operates in a floppy diskette drive of a computer;
   (b) detaching said strip from said carrier; and
   (c) attaching the detached strip to a business card.

2. A method according to claim 1 including the further steps of detaching said strip from said business card, mounting the strip on a floppy diskette carrier, inserting the floppy diskette carrier into a floppy diskette drive of a computer, and reading the data on said strip using the computer.

3. A method according to claim 1 wherein said strip is curvilinear.

4. A method according to claim 1 wherein said strip is linear.

5. A method according to claim 1 including the further steps of mounting said business card on a simulated floppy diskette so that the magnetic strip is operatively associated with the read/write head cut out slot in the floppy diskette, inserting the simulated floppy diskette into a computer, and using the read/write head of the floppy diskette drive to read the data on the magnetic strip.

6. A method for storing preselected data on a business card comprising the steps of:

(a) writing said preselected data to a magnetic strip detachably connected to a floppy diskette carrier that operates in a floppy diskette drive of a computer;
   (b) detaching said strip from said carrier;
   (c) attaching the detached strip to a business card;
   (d) mounting said business card om a simulated floppy diskette so that the magnetic strip is operatively associated with the read/write head cut-out slot in the floppy diskette;
   (e) inserting the simulated floppy diskette into a computer;
   (f) using the read/write head of the floppy diskette drive to read the data on the magnetic strip; and
   (g) translating the card relative to the simulated floppy diskette and thus relative to the read/write head of the floppy diskette drive.

7. A method for storing preselected data on a business card comprising the steps of:

(a) writing said preselected data to a magnetic strip detachably connected to a floppy diskette carrier that operates in a floppy diskette drive of a computer;
   (b) detaching said strip from said carrier;
   (c) attaching the detached strip to a business card;
   (d) mounting said business card om a simulated floppy diskette so that the magnetic strip is operatively associated with the read/write head cut-out slot in the floppy diskette;
   (e) inserting the simulated floppy diskette into a computer;
   (f) using the read/write head of the floppy diskette drive to read the data on the magnetic strip; and
   (g) holding the card fixed relative to the simulated floppy diskette and displacing the read/write head of the floppy diskette drive relative to the card.

8. A method for reading data stored on a magnetic strip on a business card comprising the steps of:

(a) mounting said card on a floppy diskette carrier that operates in a floppy diskette drive of a computer;

(b) inserting the floppy diskette carrier into a floppy diskette drive of a computer; and (c) operating the computer so that the read head moves relative to the magnetic strip thereby reading the information stored thereon.

9. A method according to claim 8 wherein the strip is curvilinear.

10. A method according to claim 8 wherein the strip is linear.

11. A method according to claim 10 wherein the strip is oriented in alignment with a radial line passing through the center of rotation of the floppy diskette drive.

12. A method according to claim 7 wherein the strip is oriented perpendicular to a radial line passing through the center of rotation of the floppy diskette drive.

13. A floppy diskette system for a computer having a floppy diskette drive with a read/write head, said system comprising:

(a) floppy diskette means including a carrier rotatably mounted in a jacket, said floppy diskette means being constructed and arranged for insertion into said floppy diskette drive so that the read/write head is operatively positioned relative to said carrier;

(b) a magnetic substrate on said carrier; and (c) said substrate being constructed and arranged so that the substrate is selectively detachable from the carrier.

14. A floppy diskette system according to claim 13 wherein said substrate is curved about an axis passing through the center of rotation of said drive when said floppy diskette means is inserted thereinto.

15. A floppy diskette system according to claim 13 wherein said substrate is linear.

16. A floppy diskette system according to claim 13 including a business card, and means for attaching said substrate to said business card.

17. A floppy diskette system according to claim 13 wherein said substrate is divided into a plurality of separate sections.

18. A floppy diskette system for a computer having a floppy diskette drive with a read/write head, said system comprising:

(a) a jacket constructed and arranged for insertion into said floppy diskette drive, having a cut-out portion aligned with the path over which the read/write head is radially displaced when said jacket is mounted in said floppy diskette drive;

(b) a business card having a linear magnetic strip affixed thereto; and (c) means mounting the card on the jacket so that the magnetic strip is operatively related to the read/write head when the jacket is inserted into said floppy disk drive.

* * * * *

UNITED STATES PATENT AND TRADEMARK OFFICE
CERTIFICATE OF CORRECTION

PATENT NO. : 4,774,618
DATED : Sept. 27, 1988
INVENTOR(S) : A. RAVIV

It is certified that error appears in the above-identified patent and that said Letters Patent is hereby corrected as shown below:

at column 2, line 38, change "accoring" to ---according---;

at column 3, line 61, change "locaated" to ---located---;

at column 3, line 65, change "conventioal" to ---conventional---;

at column 6, line 33, change "om" to ---on--- after "card"; and at column 6, line 53, change "om" to ---on--- after "card".

Signed and Sealed this

Sixteenth Day of July, 1991

Attest:

HARRY F. MANBECK, JR.

Attesting Officer

Commissioner of Patents and Trademarks